United States Patent [19]
Hustead

[11] 3,907,265
[45] Sept. 23, 1975

[54] UNIVERSAL WHEEL AND SPRING UNIT
[76] Inventor: Ralph L. Hustead, R.D. No. 2, Box 127, Uniontown, Pa. 15401
[22] Filed: Mar. 12, 1974
[21] Appl. No.: 450,479

[52] U.S. Cl............................. 267/60; 280/124 A
[51] Int. Cl.²........................................ B60G 11/16
[58] Field of Search................... 267/60; 280/124 A

[56] References Cited
UNITED STATES PATENTS
| | | | |
|---|---|---|---|
| 1,348,581 | 8/1920 | Richards | 267/60 |
| 1,418,758 | 6/1922 | Watkins | 267/60 |
| 2,744,765 | 5/1956 | Ferrier | 267/60 |

Primary Examiner—James B. Marbert

[57] ABSTRACT

An outer housing with two verticle sides, having a channel shaped piece holding two sides in place. An inner wheel U shaped carriage, two vertical sides attached at top by a channel shaped piece, the wheel mounted at lower end of vertical sides, the U shaped carriage held in place by vertical guides attached to outer housing. The top of outer housing and top of inner wheel carriage being the spring placement area, the spring held in place and also used for adjustment, by bolts passing through top of outer housing, passing through coil springs and through top of inner wheel carriage.

7 Claims, 2 Drawing Figures

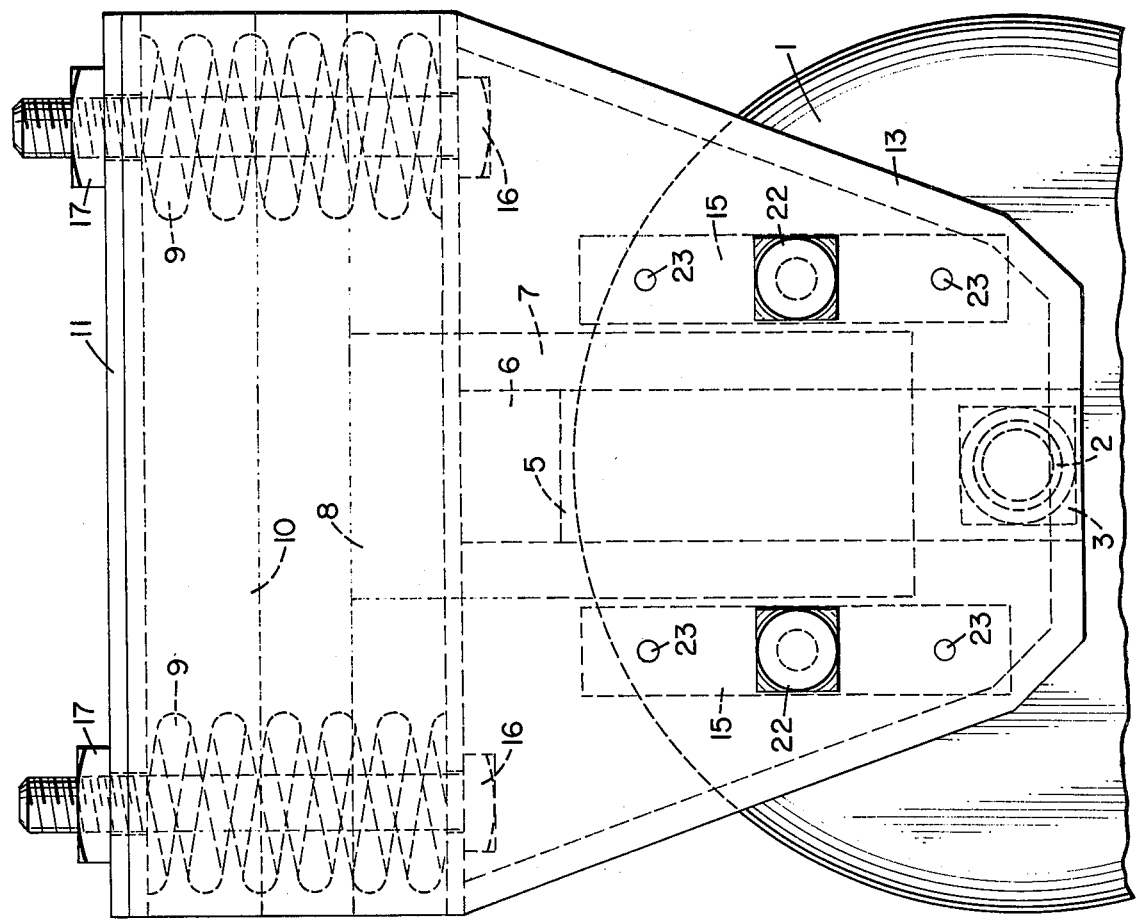
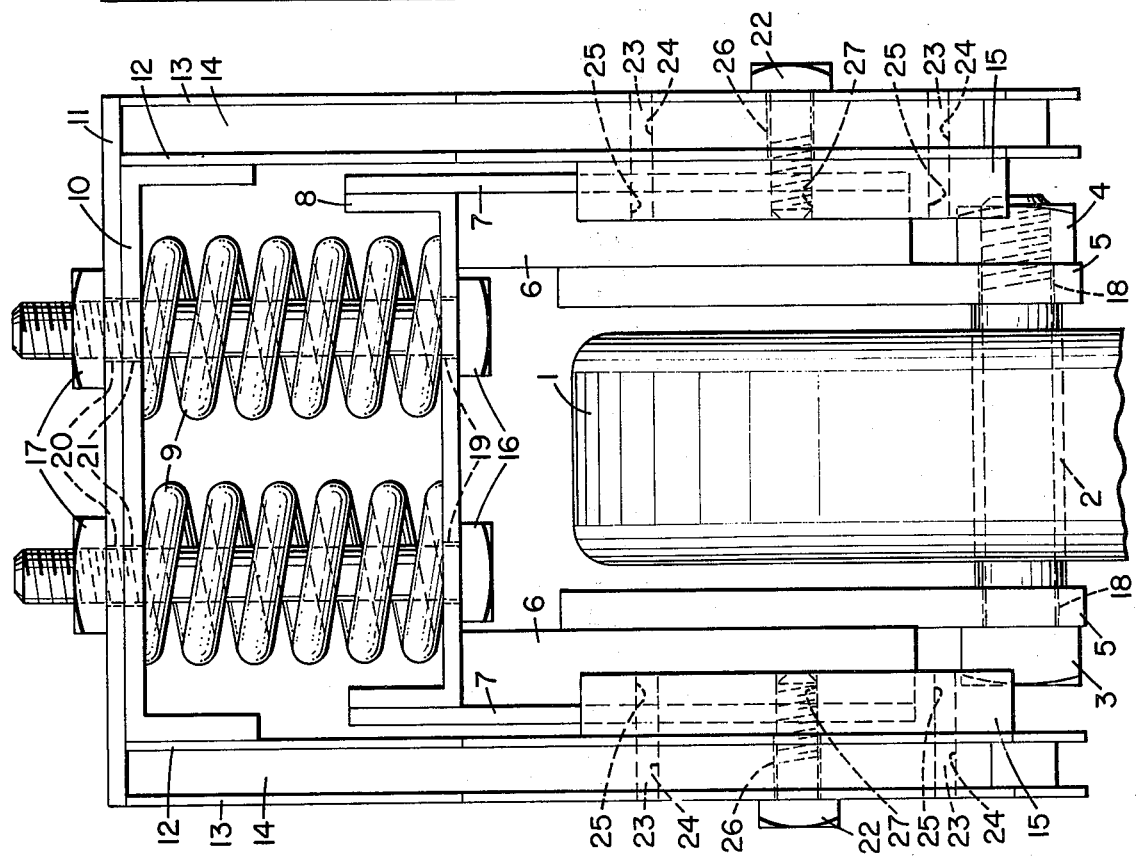

UNIVERSAL WHEEL AND SPRING UNIT

OBJECTIVE

The objective is to provide a spring and wheel unit that has abilities for quick change of spring tension for load requirement, abilities for changing springs easily for varied load requirements.

This unit is so constructed as to give a load bearing at height equal to the load carring unit, eliminating the conventional axle as a load bearing point.

BRIEF DESCRIPTION

FIG. 1 shows an end view of Universal Wheel and Spring Unit.

FIG. 2 is a side view of Universal Wheel and Spring Unit. This side view shows more clearly how load requirement brings about spring action.

DETAILED DESCRIPTION

The end view of FIG. 1, shows a wheel 1 having a sleeve bearing 2, through which passes an axle 3. This axel 3, beginning at support 5, passes through holes 18 in both supports 5, and is secured by nut 4 on the opposite end.

The supports 5 on either side of the wheel are welded to vertical bore 6 that are welded to plates 7. These pieces of steel that are welded together are welded to 8 which is a bearing plate for springs 9. The plate 8 forms the top plate of a yoke, and the supports 5, 6 and 7 form the side members of the yoke.

The outside housing that straddles the yoke includes a top plate 11 which has side structure or walls designed to stand side pressure. The side structure consists of two outer plates 13 and two inner plates 12 separated by filler 14 and 14. The parts making up each side wall are welded together, and the side walls are attached to top plate 11 by welds. In order to give additional support to the housing side walls, channel shape piece 10 is welded both to top plate 11 and to both side walls.

To hold the yoke upright and permit it to move vertically in the housing, a pair of laterally spaced parallel bars 15 are detachably connected to the inner surface of each side wall. The side members of the yoke are slidably disposed between these guide bars as shown.

These two pairs of guides are held in place by dowell pins 23 passing through holes 24 in the housing side walls and through holes 25 in guides 15 to hold the guide bars in fixed position. Bolts 22 pass through housing side wall holes 26 and 26 and are secured in the threaded holes 27 in the guide bars to hold the bars against the side walls.

There is clearance between side wheel structure 7 and guide bars 15 placed on either side of side wheel structure. This allows free vertical spring action in load requirements.

The guides 15 and 15 are located with clearance so as to permit moveable wheel unit to have vertical spring action. Also to have wheel in proper position for forward and backward movement.

Wheel unit of 1, 2, 3, 4, 5, 6, 7, and 8 is united with outer housing unit 10, 11, 12, 13, 14 and 15 in this manner.

Springs 9 are placed between the top plate 8 of the yoke, or wheel unit 1, 2, 3, 4, 5, 6, 7, 8 and the top plate 11 of outer housing unit 10, 11, 12, 13, 14 and 15. The springs are aligned with holes 19 through top plate 8 and with holes 20 and 21 through top plate 11 and channel 10. Bolts 16 extend upwardly through these holes and the coil springs.

Nuts 17, 17, 17 and 17 on bolts 16, 16, 16 and 16 secure the wheel unit to the outer housing unit and also keep 9 in place.

The spring action has a movement equal to the distance between the location of the top of side of bearing plate 8 and the side of channel 10.

The distance from the bottom of spring bearing plate 8 and top of guide 15 will allow wheel unit 1, 2, 3, 4, 5, 6, 7 and 8 to drop below side of outside housing 10, 11, 12, 13, 14 and 15 to permit taking off of nut 4 and taking out axle 3 to replace wheel for repairs.

The easy removal of springs 9 is carried out by the taking off of nuts 17 permitting the removal of bolts 16 which will allow springs to be removed and either lighter or heavier springs to be inserted for load variations to keep top of outside housing 10, 11, 12, 13, 14 and 15 at proper height for efficient load level regardless of different weights.

I claim:

1. A spring and wheel unit comprising a housing having a top load-bearing plate and a pair of side walls extending downwardly from its opposite sides, a yoke straddled by said housing, the yoke having a top plate and a pair of side members extending downwardly from its opposite sides, guide means secured to said housing side walls and holding the yoke upright with its top plate spaced below the housing top plate, the yoke being movable vertically in said housing relative to said guide means, a wheel rotatably mounted in the yoke between said side members and extending below them, vertical coil springs above the wheel disposed between said top plates for supporting the housing from the yoke, and means limiting the distance said top plates can move vertically away from each other.

2. A spring and wheel unit according to claim 1, in which said guide means are a pair of laterally spaced vertical bars secured to the inner surface of each of said side walls, and one of said yoke side members is slidably disposed between the vertical bars of each pair.

3. A spring and wheel unit according to claim 1, in which said limiting means are vertical bolts extending through said coil springs and said top plates and having threaded ends, and nuts screwed on said threaded ends, whereby said springs can be compressed to adjust the maximum spacing between said top plates.

4. A spring and wheel unit according to claim 1, in which said guide means includes a pair of laterally spaced vertical bars engaging the inner surface of each of said side walls, vertically spaced dowel pins projecting from each bar into holes in the adjoining housing side wall, and removable fasteners extending through each housing side wall and into the vertical bars engaging it for holding the bars in place, one of said yoke side members being slidably disposed between the vertical bars of each pair.

5. A spring and wheel unit according to claim 1, in which the top plate of said yoke extends in opposite directions parallel to said side walls and away from said side members, and two of said coil springs are mounted on said top plate near each end of that plate.

6. A spring and wheel unit according to claim 1, in which said yoke top plate is a channel having side flanges welded to the inner surfaces of said side members, said unit including an inverted channel welded to the bottom of said housing top plate and having downwardly extending flanges welded to the inner surfaces of said side walls.

7. A spring and wheel unit according to claim 6, in which said guide means are a pair of laterally spaced vertical bars connected to the inner surface of each of said side walls below said channels, and one of said yoke side members is slidable vertically between the vertical bars of each pair of bars.

* * * * *